United States Patent
Kawashima

(10) Patent No.: US 6,195,329 B1
(45) Date of Patent: Feb. 27, 2001

(54) TROUBLE RELEASING SYSTEM AND METHOD FOR ATM LOGIC IP SUBNETWORK

(75) Inventor: Kazuyuki Kawashima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/048,272

(22) Filed: Mar. 26, 1998

(30) Foreign Application Priority Data

Mar. 28, 1997 (JP) .................................................. 9-077702

(51) Int. Cl.[7] .................................................. G06F 11/07
(52) U.S. Cl. ........................... 370/216; 370/392; 370/466
(58) Field of Search .................................... 370/216, 217, 370/392, 395, 396, 466; 709/203, 238; 714/4, 5

(56) References Cited

U.S. PATENT DOCUMENTS

| | | | |
|---|---|---|---|
| 5,949,753 | * 9/1999 | Alexander, Jr. et al. | 370/216 |
| 5,966,513 | * 10/1999 | Horikawa et al. | 395/200.53 |
| 6,009,102 | * 12/1999 | Horikawa et al. | 370/401 |
| 6,104,870 | * 8/2000 | Frick et al. | 395/500.48 |

FOREIGN PATENT DOCUMENTS 6-120950   4/1994  (JP) .
WO 95/20282   7/1995  (WO) .

OTHER PUBLICATIONS

Xiaoqiang Chen et al., "Evolution of ATM Internetworking", *Bell Labs Technical Journal*, Spring 1997, pp. 82–110.

Ather J. Chaudhry, "Classical IP: IP Over ATM Architecture for ATM Networks", *IEEE Proceedings of the Annual Conference on Emerging Technologies and Applications in Communications*, May 1996, pp. 2–5.

* cited by examiner

Primary Examiner—Min Jung
(74) Attorney, Agent, or Firm—Sughrue, Mion, Zinn, Macpeak & Seas, PLLC

(57) ABSTRACT

The present invention provides a trouble releasing system wherein, in operation of an ATM logic IP subnetwork, interruption of communication by a stop of an address solution server is prevented. When a currently used NHS 4 which performs address solution in a logic IP subnetwork stops a server operation because of a trouble thereof, a standby NHS control unit 63 in a standby NHS 6 issues an instruction for change-over to a server operation, and consequently, the standby NHS 6 operates as a server for address solution. Further, an NHC control unit 53 in an NHC 5a retrieves an address of the standby NHS 6 registered in a server address database 51 and causes the standby NHS 6 to switchably perform communication of an address solution request.

3 Claims, 5 Drawing Sheets

1a, 1b : ATM switch
2a ~ 2c : ATM terminal

FIG. 3

|  | IP address 101 | ATM address |
|---|---|---|
| ATM switch 1a | 113.10.210.1 | 3.0.0.0.0.0.0.0.0.0.0.0.0.1.0.0.113.10.210.1 |
| ATM switch 1b | 113.10.210.2 | 3.0.0.0.0.0.0.0.0.0.0.0.0.8.0.0.113.10.210.2 |
| ATM terminal 2a | 113.10.210.5 | 3.0.0.0.0.0.0.0.0.0.0.0.0.1.0.0.113.10.210.5 |
| ATM terminal 2b | 113.10.210.6 | 3.0.0.0.0.0.0.0.0.0.0.0.0.1.0.0.113.10.210.6 |
| ATM terminal 2c | 113.10.210.7 | 3.0.0.0.0.0.0.0.0.0.0.0.0.1.0.0.113.10.210.7 |
|  | 102 | 103 |

FIG. 4

| NHS | IP address | ATM address |
|---|---|---|
| in use NHS4 | 113.10.210.9 | 3.0.0.0.0.0.0.0.0.0.0.0.0.1.0.0.113.10.210.9 |
| standby NHS6 | 113.10.210.6 | 3.0.0.0.0.0.0.0.0.0.0.0.0.1.0.0.113.10.210.6 |

|  | IP address | ATM address |
|---|---|---|
| ATM switch1a | 113.10.210.1 | 3.0.0.0.0.0.0.0.0.0.0.0.0.1.0.0.113.10.210.1 |
| ATM switch1b | 113.10.210.2 | 3.0.0.0.0.0.0.0.0.0.0.0.0.8.0.0.113.10.210.2 |
| ATM terminal 2c | 113.10.210.6 | 3.0.0.0.0.0.0.0.0.0.0.0.0.1.0.0.113.10.210.6 |
| ATM terminal 2b | 113.10.210.7 | 3.0.0.0.0.0.0.0.0.0.0.0.0.1.0.0.113.10.210.7 |
|  | 105 | 106 |

TROUBLE RELEASING SYSTEM AND METHOD FOR ATM LOGIC IP SUBNETWORK

BACKGROUND OF THE INVENTION

1. Field of the Invention

This invention relates to a trouble releasing system for an ATM (Asynchronous Transfer Mode) logic IP (Internet Protocol) network, and more particularly to a trouble releasing system for an ATM logic IP network which is constructed in an ATM network wherein a plurality of ATM switches and ATM terminals are connected arbitrarily and which uses an NHRP (Next Hop Address Resolution Protocol) as an address solution system between the ATM switches and the ATM terminals.

2. Description of the Related Art

In order to perform communication, in a logic IP subnetwork constructed in an ATM network, between an arbitrary ATM switch and ATM terminal, IP addresses of the ATM switch and the ATM terminal must be known.

One of such address solution methods employs an NHRP. The NHRP is an Internet draft proposed by the IETF (Internet Engineering Task Force) and is designated as <draft-ietf-rolc-nhrp-10.txt>.

The NHRP stores, for each logic IP subnetwork, ATM addresses and IP addresses of all of ATM switches and ATM terminals included in the logic IP subnetwork in a paired relationship with each other, and installs a server (NHS: NHRP server) for managing the ATM addresses and the IP addresses. Thereafter, the NHRP installs, for the ATM switches and the ATM terminals included in the logic IP subnetwork, clients (NHC: NHRP clients) which communicate with the NHS. Then, when any of the ATM switches and the ATM terminals tries to communicate with another ATM switch or ATM terminal, the NHC of the NHRP inquires the NHS to acquire address information to allow such communication.

Here, if the NHS which manages the addresses of the logic IP subnetwork suffers from a trouble or the like and cannot communicate any more, then the address information cannot be solved any more. This sometimes results in failure in communication with all of the ATM switches and the ATM terminals included in the logic IP subnetwork.

An example of a technique which solves a trouble of a network which arises from such failure in operation of an address server is a "Network Connection Apparatus" disclosed in Japanese Patent Laid-Open Application No. 120, 950/94.

In the network connection apparatus mentioned, a router which interconnects different LANs (Local Area Networks) additionally has a function of backing up information of a server into an alternative server, another function of supervising the state of the server and a further function of holding address information of the alternative server. The network connection apparatus uses, if the server fails, alternative addresses registered in the router in advance and serving as the backup information of the server to maintain communication and avoid the trouble.

However, the prior art described above has the following problems.

First, in order to realize an end-to-end seamless connection aimed by an original ATM network and avoid a bottleneck of a drop of the transfer rate by a router, recent ATM networks which employ a system wherein a plurality of LANs are connected directly to each other without the intervention of a router are gradually increasing.

Therefore, the concept of a logic IP network has become required. Consequently, the prior art network connection apparatus disclosed in Japanese Patent Laid-Open Application NO. 120,950/94 which requires a router has a problem in that it cannot be applied to such recent ATM networks.

Second, the network connection apparatus disclosed in the document mentioned above is directed to application only to a LAN of the broadcast type which commonly has communication media such as, for example, the Ethernet.

However, with an ATM network which is an NBMA (Non-Broadcast Multi-Access) network, since it is so constructed that a connection is established when communication is to be performed, even if another address is given, communication is not performed immediately. For this communication, address solution on the logic IP subnetwork is required. However, in order to realize this, taking such a construction of a server and a client as described above into consideration, releasing means of both of them must be controlled.

In this manner, the technique of the prior art is disadvantageous in that it cannot take a countermeasure against a trouble of a server of the address solution system of a logic IP subnetwork.

SUMMARY OF THE INVENTION

It is an object of the present invention to provide a trouble releasing system and method for an ATM logic IP subnetwork wherein, when a server suffers from a trouble, address solution of the logic IP subnetwork can be performed on the client side by maintaining a communication function with another server which can perform address solution.

According to an aspect of the present invention, there is provided a trouble releasing system for an ATM logic IP subnetwork, comprising a logic IP subnetwork composed of at least one ATM switch and a plurality of ATM terminals, an NHRP server for managing a pair of an ATM address and an IP address of the ATM switch or the ATM terminals which are present in the logic IP network, an NHRP client for communicating with the NHRP server, and a standby NHRP server for performing server operation in place of the currently used NHRP server when the currently used NHRP server has a trouble, and wherein, when the currently used NHRP server which performs address solution in the logic IP subnetwork stops the server operation because of a trouble thereof and the standby NHRP server issues an instruction for change to a server operation, the NHRP client retrieves an address of the standby NHRP server registered in advance and causes communication of a request for address solution to be switchably performed by the standby NHRP server.

The trouble releasing system for an ATM logic IP subnetwork may be constructed such that the NHRP server includes a first communication unit for communicating with the NHRP client, and a first address table for holding an address of an ATM node of the logic IP subnetwork managed by the NHRP server itself, that the NHRP client includes a server address data base for registering an address of the NHRP server and an address of the standby NHRP server, a second communication unit for communicating with the NHRP server, and an NHC control unit for controlling switching from the NHRP server to the standby NHRP server, that the standby NHRP server includes a third communication unit for communicating with the NHRP client and the NHRP server, a second address table for periodically acquiring and holding the addresses of the NHRP server and the ATM node of the logic IP subnetwork managed by the NHRP server, and a standby NHS control unit for performing switching of the NHRP server, and that, when communication between the ATM switch and the ATM terminal is to be performed based on an address solution function by the NHRP server, at a point of time when communication of the NHRP client with the NHRP server in accordance with an NHR protocol is disabled for a fixed period of time and the communication is not secured, it is discriminated that the NHRP server is in a stopping state, and the NHC control unit resumes communication using the address of the standby NHRP server acquired as an object of address solution from the server address database, whereupon the standby NHRP server accepts a protocol of a request for address registration from the NHRP client and the standby NHS control unit discriminates that switching from the NHRP server to the standby NHRP server is performed and updates the information based on the address of the logic IP subnetwork acquired from the NHRP server in advance and then performs address management of the belonging logic IP subnetwork so that the standby NHRP server operates as a main NHRP server to release the trouble.

According to another aspect of the present invention, there is provided a trouble releasing method for an ATM logic IP subnetwork described above, wherein the standby NHS server executes a first step wherein the standby NHS server issues a request for registration of the IP address of the standby NHRP server itself and an address solution request using the ATM address in order to derive an IP address from the ATM address to the currently used NHRP server, a second step wherein, when no response to the request is received and the communication stops, the standby NHS control unit instructs the standby NHS communication unit for change-over to a server operation, a third step wherein, when an address registration request from the NHRP client is received by the standby NHRP server, the standby NHRP server starts operation of a server and registers the address information of the NHRP client into the second address table, and a fourth step wherein, when an address solution request is received from the NHRP client, the standby NHS control unit retrieves a corresponding address from the second address table and transmits IP address data, and the NHRP client executes a fifth step wherein, as a result of execution of the first to fourth steps, the NHRP client retrieves the server address database and issues a registration request of the self IP address and an address solution request to the currently used NHRP server, a sixth step wherein, when a response to the request is not received and the communication stops, the ATM address information of the standby NHRP server is retrieved from the server address database and change-over of the destination of address registration and solution requests is communicated with the standby NHRP server, and a seventh step wherein, after a response to the address solution request issued to the standby NHRP server is received, the address information is received.

First, operation of the present invention is described.

In the standardization provisions regarding the NHRP, an NHC is allowed to have information of a plurality of addresses of an NHS. However, the provisions do not provide for proper use of the information. Therefore, as such information of one of addresses, an ATM address of a standby NHS is allocated first.

Then, on each logic IP subnetwork, an ATM terminal which serves as a standby NHS is prepared, and initially, the ATM terminal itself acts as an NHC and normally supervises a state of a current NHS.

If communication with the current NHS is impossible, then the ATM terminal which is to server as a standby NHS discriminates that the NHS has suffered from a trouble and performs preparations as a standby NHS. Simultaneously, the NHC tries to perform communication with the standby NHS based on an ATM address of the new NHS registered in advance and register the address. In response to the operation, the standby NHS operates as an operating NHS and provides an address solution function of the logic IP subnetwork.

With the present invention, even if the NHS stops because of a trouble thereof or the like, since an address solution function which uses the standby NHS is automatically and switchably rendered operative in the inside of the logic IP subnetwork, the time for which communication between an ATM switch and an ATM terminal is interrupted can be suppressed short with a minimum equipment.

Further, since data used in the present system are all included in the range provided for by the standardization, such a situation that data which do not conform to the data provisions of the standardization must be used as a result of employment of the present invention is eliminated.

With the present invention, since, even if a server which is essential in a logic IP subnetwork stops, operation of the server can be replaced by operation of a standby server and consequently a countermeasure against a trouble of the logic IP subnetwork peculiar to an ATM can be taken and the time for which communication is impossible can be suppressed to the minimum, there is an effect that the reliability is improved remarkably.

Further, since a mechanism for switching server operation to a standby server is incorporated also in the client side, also the relationship between a server and a client provided for by the standardization of the NHR protocol is maintained, and consequently, there is an effect that it is not necessary to incorporate a function which does not conform to the standards and the productivity is improved remarkably.

BRIEF DESCRIPTION OF THE DRAWINGS

FIG. 3 is a table illustrating an example of contents of an NHS address table of an NHS shown in FIG. 2;

FIG. 4 is a table illustrating an example of contents of a server address data base of the NHC shown in FIG. 2;

FIG. 5 is a table illustrating an example of contents of an address table of a standby NHS shown in FIG. 2;

DESCRIPTION OF THE PREFERRED EMBODIMENT

In the following, an embodiment of the present invention is described in detail with reference to the drawings.

Figure 1:
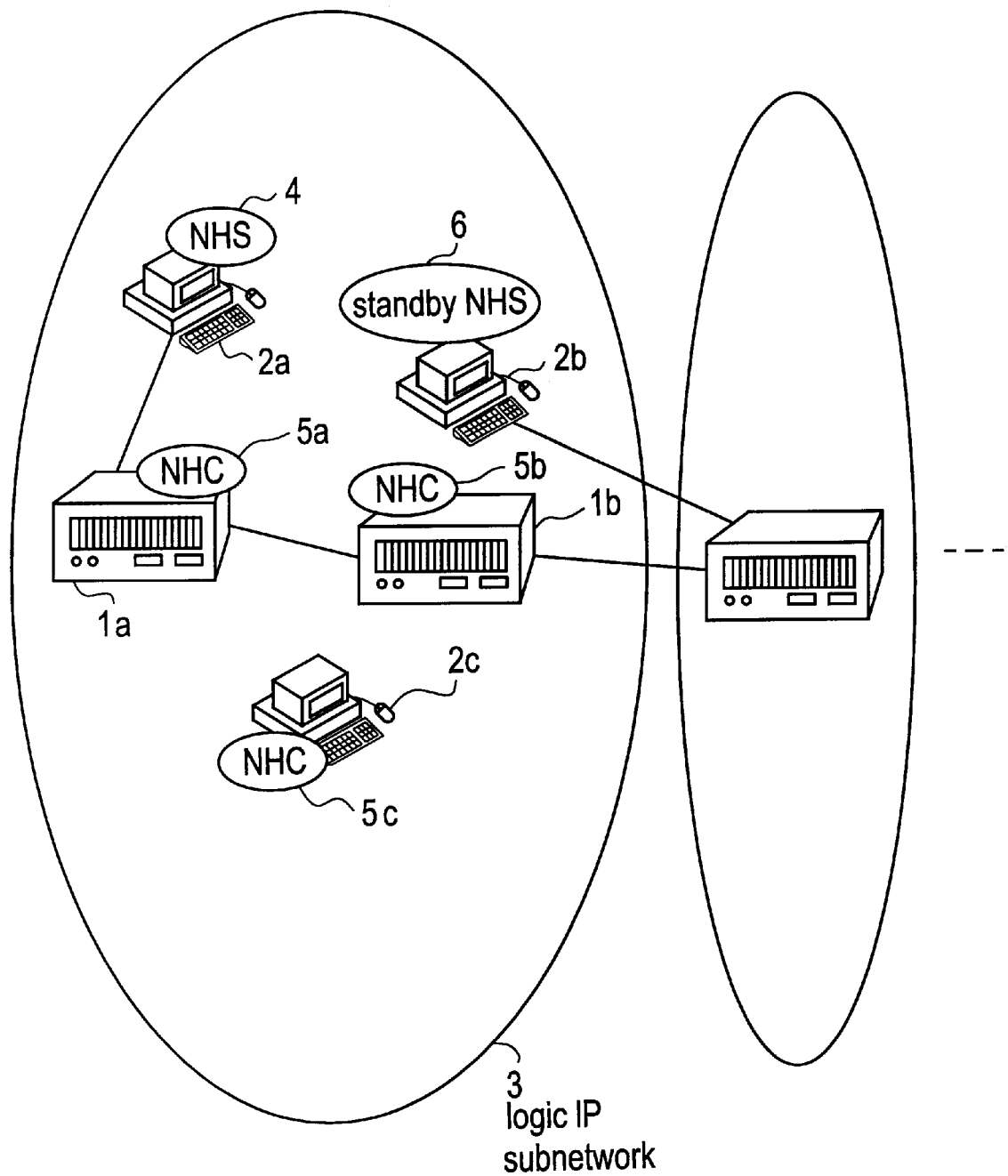
FIG. 1 is a system block diagram of an ATM network which constructs a logic IP network showing an embodiment of a trouble releasing system for an ATM logic subnetwork of the present invention.
Figure 2:
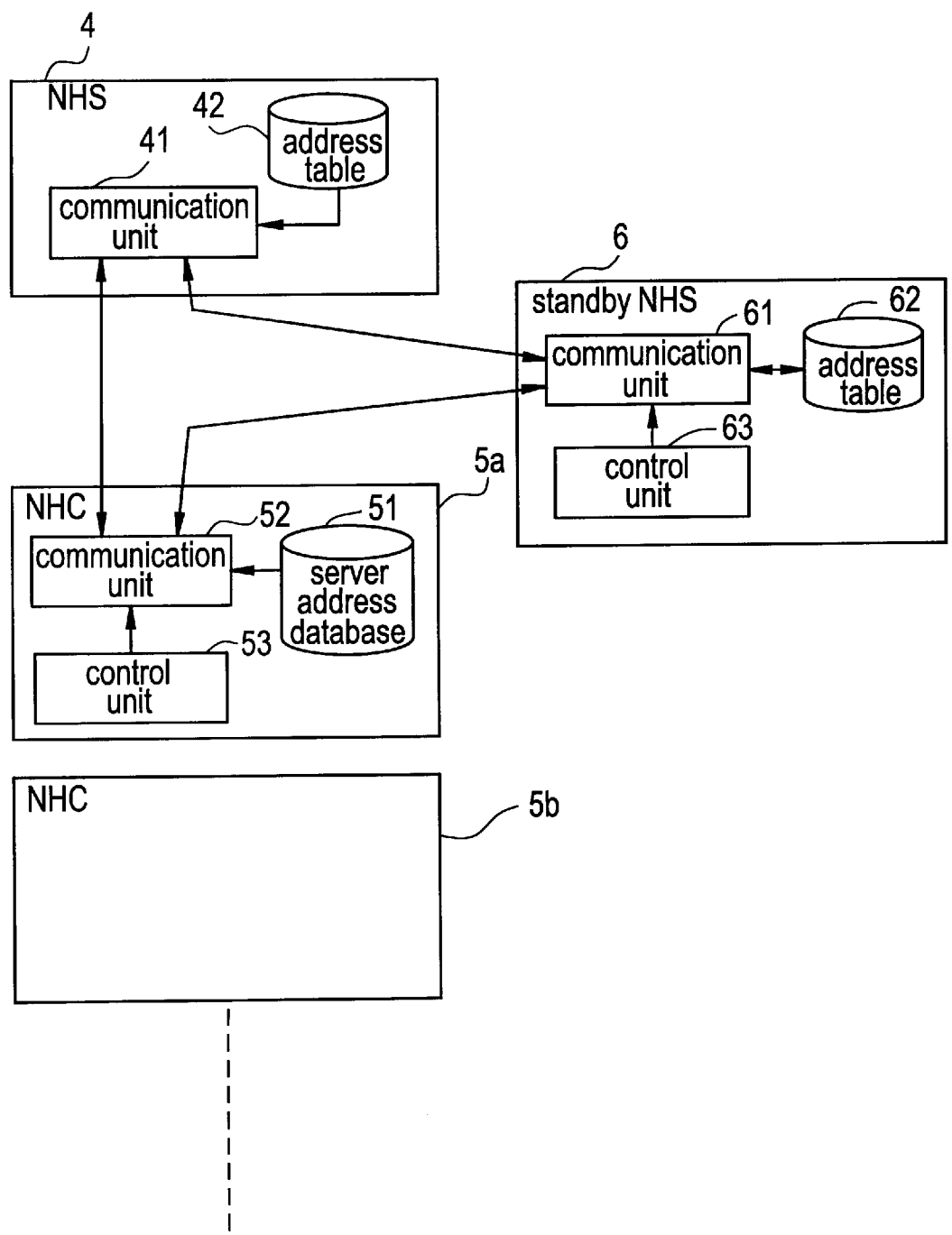
FIG. 2 is a function block diagram of the logic IP subnetwork shown in FIG. 1.

FIG. 1 is a system block diagram of an ATM network which constructs a logic IP network showing an embodiment of a trouble releasing system for an ATM logic subnetwork of the present invention, FIG. 2 is a function block diagram of the logic IP subnetwork shown in FIG. 1, FIG. 3 is a table illustrating an example of contents of an NHS address table of an NHS shown in FIG. 2, FIG. 4 is a table illustrating an example of contents of a server address data base of the NHC shown in FIG. 2, and FIG. 5 is a table illustrating an example of contents of an address table of a standby NHS shown in FIG. 2.

Referring to FIG. 1, the ATM network of the present embodiment includes a logic IP subnetwork 3 composed of a plurality of (two in FIG. 1) ATM switches 1a, 1b; a plurality of (three in FIG. 1) ATM terminals 2a, 2b, 2c; an NHRP server (NHS) 4 which manages pairs of ATM addresses and IP addresses of the ATM switches 1a, 1b and ATM terminals 2a, 2b, 2c present in the logic IP subnetwork 3; NHRP clients (NHCs) 5a, 5b, 5c provided in the ATM switches 1a, 1b and ATM terminal 2c for communicating with the NHS 4; and a standby NHRP server (standby NHS) 6 provided in the ATM terminal 2b.

Referring now to FIG. 2, the NHS 4 includes an NHS communication unit 41 for communicating with the NHC 5a, and an NHS address table 42 which holds addresses of ATM switches and ATM terminals of ATM nodes of the logic IP subnetwork 3 managed by the self NHS 4. Meanwhile, the NHC 5a includes a server address database 51 in which an address of the NHS 4 and an address of the standby NHS 6 are registered, an NHC communication unit 52 for communicating with the NHS 4, and an NHC control unit 53 for controlling switching of the NHS. Further, the standby NHS 6 includes a standby NHS communication unit 61 for performing communication between the NHS 4 and the NHC 5a, an address table 62 for periodically acquiring and holding the addresses of the ATM switches and ATM terminals of the ATM nodes of the logic IP subnetwork 3 managed by the NHS 4 when the NHS 4 is stopped using the standby NHS communication unit 61, and a standby NHS control unit 63 which performs switching of the NHS.

The NHS communication unit 41 receives an address solution request from the NHC 5a and transmits an ATM address obtained by referring to the NHS address table 42 to the NHC 5a.

The NHS address table 42 of the NHS 4 holds, as seen in FIG. 3, IP addresses (for example, an IP address 101 of the ATM switch 1a and an IP address 102 of the ATM terminal 2c) and ATM addresses (for example, an ATM address 103 of the ATM terminal 2c) of all of the ATM switches (ATM switches 1a and 1b shown in FIG. 1) and all of the ATM terminals (ATM terminals 2a, 2b and 2c shown in FIG. 1) included in the logic IP subnetwork 3 managed by the NHS 4.

Meanwhile, the server address database 51 of the NHC 5a holds, as seen in FIG. 4, the IP addresses and the ATM addresses (for example, an ATM address 104 of the standby NHS 6) of the currently used NHS 4 and the standby NHS 6.

The NHC communication unit 52 of the NHC 5a transmits IP address information which is an address solution request to the NHS 4 or the standby NHS 6 to the NHS communication unit 41 or the standby NHS communication unit 61 and receives solved ATM address information.

The NHC control unit 53 refers, when communication with the NHS 4 stops, to the ATM address 104 of the standby NHS 6 in the server address database 51 and switches communication of an address solution request from the currently used NHS 4 to the standby NHS 6.

Further, the standby NHS communication unit 61 of the standby NHS 6 performs, in an ordinary operation, operation equivalent to that of the NHC communication unit 52 of the NHC 5a, but performs, when the NHS 4 stops, operation equivalent to that of the NHS communication unit 41.

The address table 62 of the standby NHS 6 holds, as seen in FIG. 5, the IP addresses (for example, an IP address 105 of the ATM terminal 2c) and the ATM addresses (for example, an ATM address 106 of the ATM terminal 2c) of all of the ATM switches (the ATM switches 1a and 1b shown in FIG. 1) and all of the ATM terminals (ATM terminals 2b and 2c shown in FIG. 1) included in the logic IP subnetwork 3 managed by the NHS 4 when the NHS 4 stops and the standby NHS 6 operates. Here, information regarding the standby NHS 6 which has been operating as a client till now is excepted.

It is to be noted that the standby NHS control unit 63 controls operation of the standby NHS communication unit 61.

Now, operation of the present embodiment is described in detail with reference to FIGS. 2, 6 and 7.

Figure 6:
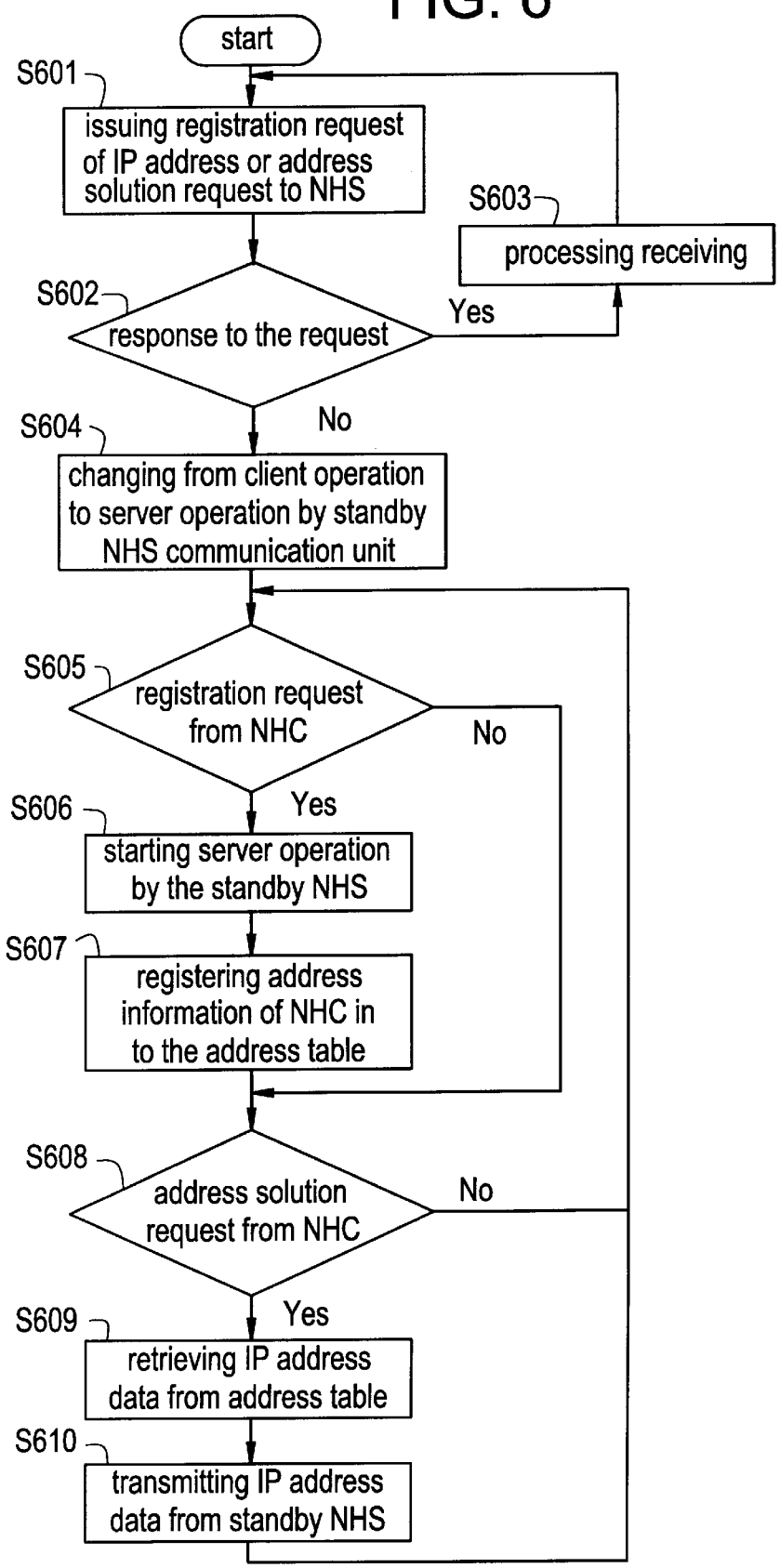
FIG. 6 is a flow chart illustrating an operation procedure of the standby NHS shown in FIG. 2.
Figure 7:
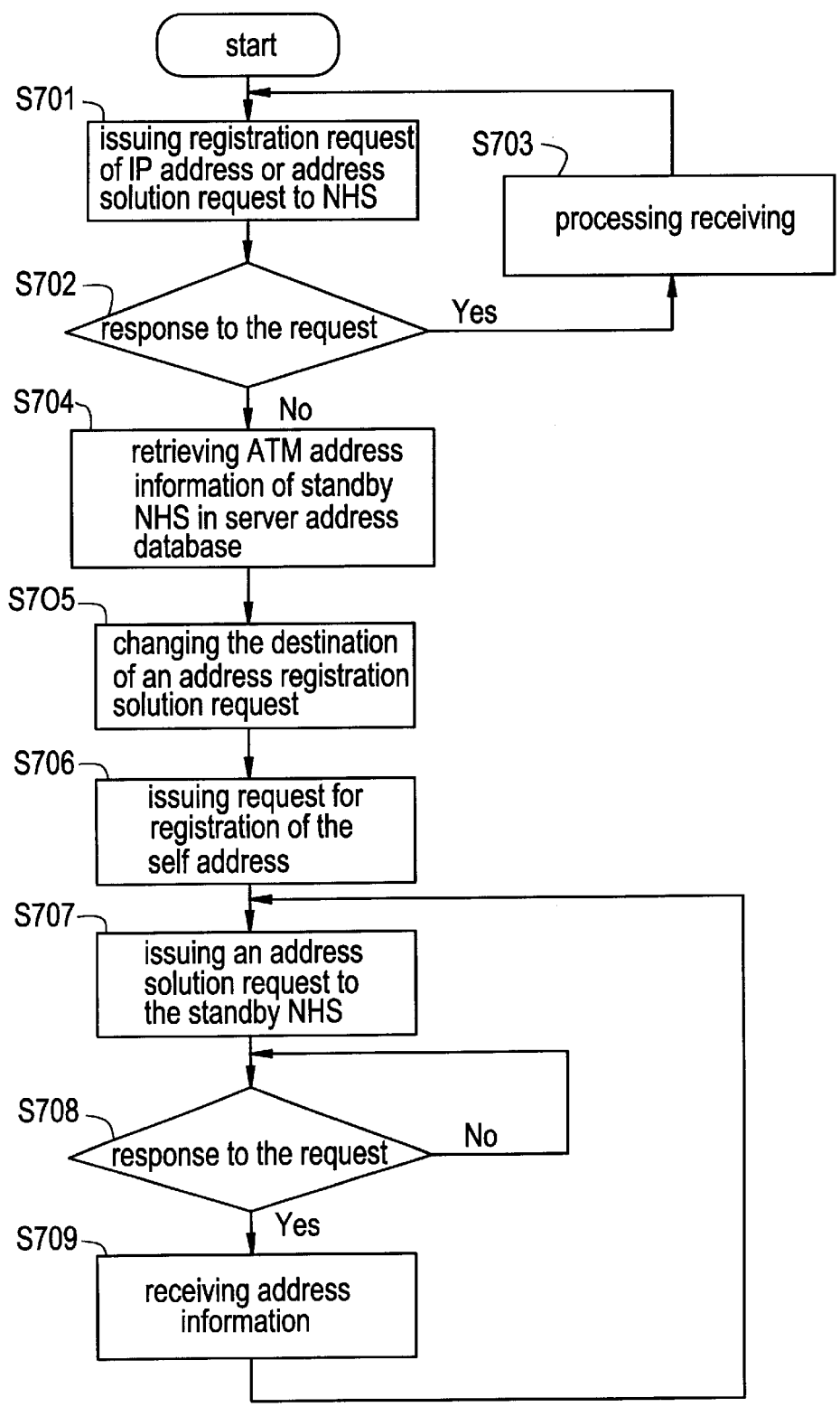
FIG. 7 is a flow chart illustrating an operation procedure of the NHC shown in FIG. 2.

FIG. 6 is a flow chart illustrating an operation procedure of the standby NHS shown in FIG. 2, and FIG. 7 is a flow chart illustrating an operation procedure of the NHC shown in FIG. 2.

When communication between the standby NHS 6 or the NHC 5a and the currently used NHS 4 stops, the standby NHS 6 and the NHC 5a individually perform the following operations.

First, referring also to FIG. 6, the standby NHS 6 issues, similarly as in operation of the NHC 5a, using the standby NHS communication unit 61, a registration request of the self IP address into the currently used NHS 4 or an address solution request for deriving an IP address from an ATM address using an ATM address (step S601).

Here, if a response to the request is received and communication is possible (Yes in step S602), then receiving processing of receiving a response of IP address information or completion of registration from the NHS communication unit 41 is performed (step S603).

On the other hand, if the discrimination in step S602 is No, that is, if communication stops, then the standby NHS control unit 63 instructs the standby NHS communication unit 61 for change-over from client operation to server operation.

Consequently, the standby NHS 6 makes preparations so that it may process an address registration request or address solution request of the NHC 5a using the address table 62 (step S604).

Here, if a registration request is transmitted from the NHC 5a which will be hereinafter described to the standby NHS 6 (Yes in step S605), then the standby NHS 6 starts operation of a server (step S606) and registers address information of the NHC 5a into the address table 62 (step S607).

Thereafter, if an address solution request for deriving an ATM address based on an IP address is transmitted from the NHC 5a and is received by the standby NHS communication unit 61 (Yes in step S608), then the standby NHS control unit 63 refers to the address table 62 (step S609) and IP address data are transmitted from the standby NHS communication unit 61 (step S610). Thereafter, the control returns to step S605.

It is to be noted that, even if the discrimination in step S608 is No, that is, even if an address solution request for deriving an ATM address based on an IP address is not transmitted from the NHC 5a, the control returns to step S605.

Now, referring also to FIG. 7, the NHC 5a issues a registration request of the self IP address into the currently used NHS 4 or an address solution request for deriving an IP address from an ATM address using an ATM address and using address data of the NHS held in the server address database 51 (step S701).

Here, if a response to the request is received and communication is possible (Yes in step S702), then the NHC 5a performs receiving processing of receiving a response of IP address information or completion of registration from the NHS communication unit 41 (step S703).

On the other hand, if the discrimination in step S702 is No, that is, if communication stops, then the NHC control unit 53 retrieves the ATM address information of the standby NHS 6 held in the server address database 51 (step S704) and changes the destination of an address registration solution request so that the NHC communication unit 52 may communicate with the standby NHS 6 (step S705).

Consequently, the NHC 5a establishes connection to the standby NHS 6 using the ATM address and issues a request for registration of the self address (step S706). This relates to the step S605 described above.

Thereafter, the NHC 5a issues an address solution request to the standby NHS 6 (step S707) and receives a response (Yes in step S708), and then receives address information (step S709).

Now, operation of a detailed working example of the present invention is described in detail.

In FIG. 1, the two ATM switches 1a and 1b and the three ATM terminals 2a, 2b and 2c are present in the logic IP subnetwork 3, and the currently used NHS 4 is present in the ATM terminal 2a while the standby NHS 6 is present in the ATM terminal 2b as described hereinabove.

Then, it is assumed that the ATM addresses and the IP addresses of them are described in such a manner as seen in FIG. 3 in the NHS address table 42. For example, the IP address 101 of the ATM switch 1a is "113.10.210.1" as seen in FIG. 3.

Usually, the NHS responses to an address solution request from the NHC 5a based on the NHS address table 42. For example, it is assumed that an address solution request of the ATM terminal 2c is received and the IP address data "113.10.210.7" is received. When conversion from the IP address data into an ATM address data is to be performed, since the IP address mentioned above is the same as the IP address 102 shown in FIG. 3, an ATM address corresponding to it is retrieved, and data of the ATM address 103 "3. 0. 0. 0. 0. 0. 0. 0. 0. 0. 0. 1. 0. 0. 113. 10. 210. 7" is transmitted as a reply.

Here, description is given of how the standby NHS 6 of the ATM terminal 2b and the NHC 5a of the ATM terminal 2c operate when a trouble occurs with the ATM terminal 2a and operation of the currently used NHS 4 stops.

After operation of the NHS 4 stops, the address solution operation is not performed any more and the communication is interrupted. This is detected from interruption of reception of a response to an address solution request (step S601) issued from the standby NHS 6 of the ATM terminal 2b or to an address solution request (step S701) issued from the NHC 5c of the ATM terminal 2c.

Thus, in the standby NHS 6 of the ATM terminal 2b, the standby NHS control unit 63 issues a request for changeover from a client operation to a server operation to the standby NHS communication unit 61 and changes its operation from operation of the NHC 5b in which it receives a response to operation of a server in which it receives a request of a client and transmits address solution information (step S604).

Simultaneously, the NHC 5c of the ATM terminal 2c retrieves the address of the standby NHS 6 from the server address database 51 (step S704). This corresponds to the ATM address 104 shown in FIG. 4, and based on the ATM address "3. 0. 0. 0. 0. 0. 0. 0. 0. 0. 0. 0. 0. 1. 0. 0. 113. 10. 210. 6", the NHC 5c changes over a request for address solution to the standby NHS 6 of the ATM terminal 2b (step S705) and transmits address information and a registration request (step S706).

The standby NHS 6 of the ATM terminal 2b receiving the registration request stores the IP address and the ATM address of the ATM terminal 2c into the address table 62. They correspond to the IP address 105 and the ATM address 106 shown in FIG. 5.

Similarly, address data also of the other ATM switches 1a and 1b are registered (step S607). However, the address data of the ATM terminal 2a which is in a stopping state is not held (refer to FIG. 5).

In this manner, in the present working example, the NHS 4 is switched to the standby NHS 6 and the address solution function can be realized continuously by the standby NHS 6.

What is claimed is:

1. A trouble releasing system for an ATM logic IP subnetwork, comprising:

a logic IP subnetwork composed of at least one ATM switch and a plurality ATM terminals;

an NHRP server for managing a pair of an ATM address and an IP address of said ATM switch or said ATM terminals which are present in said logic IP network;

an NHRP client for communicating with said NHRP server; and a standby NHRP server for performing server operation in place of the currently used NHRP server when said currently used NHRP server has a trouble; and wherein, when said currently used NHRP server which performs address solution in said logic IP subnetwork stops the server operation because of a trouble thereof and said standby NHRP server issues an instruction for change to a server operation, said NHRP client retrieves an address of said standby NHRP server registered in advance and causes communication of a request for address solution to be switchably performed by said standby NHRP server.

2. A trouble releasing system for an ATM logic IP subnetwork as claimed in claim 1, wherein:

said NHRP server includes a first communication unit for communicating with said NHRP client, and a first address table for holding an address of an ATM node of said logic IP subnetwork managed by said NHRP server itself;

said NHRP client includes a server address data base for registering an address of said NHRP server and an address of said standby NHRP server, a second communication unit for communicating with said NHRP server, and an NHC control unit for controlling switching from said NHRP server to said standby NHRP server;

said standby NHRP server includes a third communication unit for communicating with said NHRP client and said NHRP server, a second address table for periodically acquiring and holding the addresses of said NHRP server and said ATM node of said logic IP subnetwork managed by said NHRP server, and a standby NHS control unit for performing switching of said NHRP server; and, when communication between said ATM switch and said ATM terminal is to be performed based on an address solution function by said NHRP server, at a point of time when communication of said NHRP client with said NHRP server in accordance with an NHR protocol is disabled for a fixed period of time and the communication is not secured, it is discriminated that said NHRP server is in a stopping state, and said NHC control unit resumes communication using the address of said standby NHRP server acquired as an object of address solution from said server address database, whereupon said standby NHRP server accepts a protocol of a request for address registration from said NHRP client and said standby NHS control unit discriminates that switching from said NHRP server to said standby NHRP server is performed and updates the information based on the address of said logic IP subnetwork acquired from said NHRP server in advance and then performs address management of said belonging logic IP subnetwork so that said standby NHRP server operates as a main NHRP server to release the trouble.

3. A trouble releasing method for an ATM logic IP subnetwork, comprising the steps of:

issuing a request for registration of an IP address of a standby NHRP server itself and an address solution request using an ATM address in order to derive the IP address from the ATM address to a currently used NHRP server by the standby NHS server;

instructing, when no response to the request is received and a communication stops, a standby NHS communication unit for change-over to a server operation by a standby NHS control unit;

starting, when an address registration request from a NHRP client is received, operation of a server by said standby NHRP server;

registering an address information of said NHRP client into a second address table by said standby NHRP server;

retrieving, when an address solution request is received from said NHRP client, a corresponding address from said second address table by said standby NHS control unit;

transmitting IP address data by said standby NHS control unit;

retrieving a server address database by said NHRP client by said NHRP client;

issuing a registration request of the self IP address and the address solution request to said currently used NHRP server by said NHRP client;

retrieving, when a response to the request is not received and the communication stops, the ATM address information of said standby NHRP server from said server address database by said standby NHRP server;

communicating change-over of the destination of address registration and solution requests by said standby NHRP server; and receiving, after a response to the address solution request issued to said standby NHRP server is received, the address information.

* * * * *